US008378972B2

(12) United States Patent
Pance et al.

(10) Patent No.: US 8,378,972 B2
(45) Date of Patent: Feb. 19, 2013

(54) KEYBOARD WITH INCREASED CONTROL OF BACKLIT KEYS

(75) Inventors: Aleksandar Pance, Saratoga, CA (US); Alex J. Crumlin, San Jose, CA (US); Nicholas Vincent King, San Jose, CA (US); Duncan Kerr, San Francisco, CA (US); Chris Ligtenberg, San Carlos, CA (US); James E. Orr, IV, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 926 days.

(21) Appl. No.: 12/476,000

(22) Filed: Jun. 1, 2009

(65) Prior Publication Data

US 2010/0302169 A1     Dec. 2, 2010

(51) Int. Cl.
*G09G 5/00* (2006.01)
(52) U.S. Cl. .................................... 345/170; 345/168
(58) Field of Classification Search .......... 345/168–172; 341/22–28
See application file for complete search history.

(56) References Cited

U.S. PATENT DOCUMENTS

| | | |
|---|---|---|
| 3,060,790 A | 10/1962 | Ward |
| 3,754,209 A | 8/1973 | Molloy et al. |
| 4,855,740 A | 8/1989 | Muramatsu et al. |
| 5,040,479 A | 8/1991 | Thrash |
| 5,317,105 A | 5/1994 | Weber |
| 5,342,991 A | 8/1994 | Xu et al. |
| 5,456,955 A | 10/1995 | Muggli |
| 5,770,898 A | 6/1998 | Hannigan et al. |
| 5,975,953 A | 11/1999 | Peterson |
| 6,180,048 B1 | 1/2001 | Katori |
| 6,347,882 B1 | 2/2002 | Vrudny et al. |
| 6,545,668 B1 * | 4/2003 | Hayama ..................... 345/172 |
| 6,654,174 B1 | 11/2003 | Huang |
| 6,713,672 B1 | 3/2004 | Stickney |
| 6,762,381 B2 | 7/2004 | Kunthady et al. |
| 6,797,902 B2 | 9/2004 | Farage et al. |

(Continued)

FOREIGN PATENT DOCUMENTS

| | | |
|---|---|---|
| CN | 201185147 | 1/2009 |
| EP | 1566686 | 8/2005 |

(Continued)

OTHER PUBLICATIONS

Author Unknown, "Electronic Polymers, Semiconducting Polymers and Light Emitting Polymers—Focus of Polythiophene," Azom.com, http://www.azom.com/details.asp?ArticleID=2772, at least as early as Dec. 1, 2005.

(Continued)

*Primary Examiner* — Regina Liang
(74) *Attorney, Agent, or Firm* — Dorsey & Whitney LLP

(57) ABSTRACT

Methods and apparatuses are disclosed that provide increased control of backlit keys for a keyboard. Some embodiments may include controllers within the keyboard that are capable of dynamically programming illumination of the keyboard based upon interaction, where each key of the keyboard may be individually programmed in a dynamic manner. For example, a spell checking function may be executing on a computer system, and as the user types various words, the keyboard may dynamically program the illumination of keyboard controllers such that the next letter of the word being typed is illuminated by the keyboard. Also, different keyboard illumination schemes may be generated based upon mouse movements by the user and/or based upon which application is currently executing.

19 Claims, 9 Drawing Sheets

U.S. PATENT DOCUMENTS

| | | | |
|---|---|---|---|
| 6,800,805 B2 | 10/2004 | Deguchi | |
| 6,834,294 B1 | 12/2004 | Katz | |
| 6,879,317 B2 * | 4/2005 | Quinn et al. | 345/168 |
| 6,998,594 B2 | 2/2006 | Gaines et al. | |
| 7,001,060 B1 | 2/2006 | Kimura | |
| 7,019,242 B2 | 3/2006 | Kim | |
| 7,053,799 B2 | 5/2006 | Yu et al. | |
| 7,088,261 B2 | 8/2006 | Sharp et al. | |
| 7,133,030 B2 | 11/2006 | Bathiche | |
| 7,161,587 B2 | 1/2007 | Beck et al. | |
| 7,236,154 B1 | 6/2007 | Kerr et al. | |
| 7,281,837 B2 | 10/2007 | Yue et al. | |
| 7,283,066 B2 | 10/2007 | Shipman | |
| 7,315,908 B2 | 1/2008 | Anderson | |
| 7,326,154 B2 | 2/2008 | Foley | |
| 7,364,339 B2 | 4/2008 | Park | |
| 7,414,213 B2 | 8/2008 | Hwang et al. | |
| 7,417,624 B2 | 8/2008 | Duff | |
| 7,446,303 B2 | 11/2008 | Maniam et al. | |
| 7,453,441 B1 | 11/2008 | Iorfida et al. | |
| 7,470,866 B2 | 12/2008 | Dietrich et al. | |
| 7,473,139 B2 | 1/2009 | Barringer et al. | |
| 7,557,312 B2 | 7/2009 | Clark et al. | |
| 7,557,690 B2 | 7/2009 | McMahon | |
| 7,582,839 B2 * | 9/2009 | Kyowski et al. | 200/310 |
| 7,598,686 B2 | 10/2009 | Lys et al. | |
| 7,692,111 B1 | 4/2010 | Rosing et al. | |
| 7,710,369 B2 | 5/2010 | Dowling | |
| 7,712,910 B2 | 5/2010 | Ng et al. | |
| 7,750,282 B2 | 7/2010 | Mahowald et al. | |
| 7,750,352 B2 | 7/2010 | Thurk | |
| 7,778,590 B2 | 8/2010 | Kogo | |
| 7,825,907 B2 | 11/2010 | Choo et al. | |
| 7,825,917 B2 | 11/2010 | Bryant et al. | |
| 7,863,822 B2 | 1/2011 | Stoschek et al. | |
| 7,880,131 B2 | 2/2011 | Andre et al. | |
| 7,968,835 B2 | 6/2011 | Tsai | |
| 8,017,216 B2 | 9/2011 | Kato et al. | |
| 8,018,170 B2 | 9/2011 | Chen et al. | |
| 8,080,753 B2 | 12/2011 | Yeh et al. | |
| 8,160,562 B2 * | 4/2012 | Yuki et al. | 345/169 |
| 8,232,958 B2 | 7/2012 | Tolbert | |
| 8,282,261 B2 | 10/2012 | Pance et al. | |
| 2003/0043589 A1 | 3/2003 | Blank | |
| 2003/0174072 A1 | 9/2003 | Salomon | |
| 2003/0210221 A1 | 11/2003 | Aleksic | |
| 2004/0032745 A1 | 2/2004 | Pederson | |
| 2004/0195494 A1 | 10/2004 | Kok et al. | |
| 2004/0204190 A1 | 10/2004 | Dietrich et al. | |
| 2004/0230912 A1 | 11/2004 | Clow et al. | |
| 2004/0238195 A1 | 12/2004 | Thompson | |
| 2005/0073446 A1 | 4/2005 | Lazaridis et al. | |
| 2006/0022951 A1 | 2/2006 | Hull | |
| 2006/0033443 A1 | 2/2006 | Ishii et al. | |
| 2006/0042820 A1 | 3/2006 | Lin et al. | |
| 2006/0158353 A1 | 7/2006 | Tseng | |
| 2007/0046646 A1 | 3/2007 | Kwon et al. | |
| 2007/0090962 A1 | 4/2007 | Price et al. | |
| 2008/0001787 A1 | 1/2008 | Smith et al. | |
| 2008/0111500 A1 | 5/2008 | Hoover et al. | |
| 2008/0127537 A1 | 6/2008 | Boisseau | |
| 2008/0143560 A1 | 6/2008 | Shipman | |
| 2008/0166006 A1 | 7/2008 | Hankey et al. | |
| 2008/0303918 A1 | 12/2008 | Keithley | |
| 2009/0173533 A1 | 7/2009 | Brock et al. | |
| 2009/0173534 A1 | 7/2009 | Keiper et al. | |
| 2009/0176391 A1 | 7/2009 | Brock et al. | |
| 2009/0201179 A1 | 8/2009 | Shipman et al. | |
| 2009/0277763 A1 | 11/2009 | Kyowski et al. | |
| 2010/0008030 A1 | 1/2010 | Weber et al. | |
| 2010/0044067 A1 | 2/2010 | Wong et al. | |
| 2010/0238120 A1 * | 9/2010 | Hsieh | 345/170 |
| 2010/0265181 A1 | 10/2010 | Shore | |
| 2010/0300856 A1 | 12/2010 | Pance et al. | |
| 2010/0301755 A1 | 12/2010 | Pance et al. | |
| 2010/0306683 A1 | 12/2010 | Pance et al. | |
| 2011/0280042 A1 | 11/2011 | Pance et al. | |
| 2011/0304485 A1 | 12/2011 | Mahowald et al. | |
| 2012/0012448 A1 | 1/2012 | Pance et al. | |
| 2012/0013490 A1 | 1/2012 | Pance | |

FOREIGN PATENT DOCUMENTS

| | | |
|---|---|---|
| EP | 1881513 | 1/2008 |
| EP | 2017694 | 1/2009 |
| GB | 2431001 | 4/2007 |
| JP | 60004094 | 1/1985 |
| JP | 04212289 | 8/1992 |
| JP | 04324294 | 11/1992 |
| JP | 05238309 | 9/1993 |
| JP | 06251889 | 9/1994 |
| JP | 06318050 | 11/1994 |
| JP | 07014694 | 1/1995 |
| JP | 10073865 | 3/1998 |
| JP | 2000098942 | 4/2000 |
| JP | 2005032470 | 2/2005 |
| JP | 2005293853 | 10/2005 |
| JP | 2006041043 | 2/2006 |
| KR | 100870113 | 11/2008 |
| WO | WO2007/002796 | 1/2007 |
| WO | WO2007/102633 | 9/2007 |
| WO | WO2009/136929 | 11/2009 |

OTHER PUBLICATIONS

Author Unknown, "Long Polymers Light Up LEDs," Physicsweb. org, http://www.physicsweb.org/articles/news/6/4/22/1, at least as early as Apr. 30, 2002.

Author Unknown, "Optimus Keyboard," Art.Lebedev Studio, http://www.artlebedev.com/portfolio/optimus/, at least as early as Dec. 1, 2005.

Author Unknown, "Optimus OLED Keyboard," Gizmodo: The Gadgets Weblog, http://www.gizmodo.com/gadgets/peripherals/input/optimus-oled-keyboard-112517.php, at least as early as Dec. 1, 2005.

Author Unknown, "Optimus OLED Keyboard with Customizable Layout," Gear Live, http://www.gearlive.com/index.php/news.article/optimus_oled_keyboard_07131058/, at least as early as Dec. 1, 2005.

Author Unknown, "Optimus Russian Keyboard," Primo Tech, http://www.primotechnology.com/index.php?art+articles/0705/optimus/index.htm, at least as early as Dec. 1, 2005.

Author Unknown, "Organic Light-Emitting Diode," Wikipedia.com, http://en.wikipedia.org/wiki/OLED, at least as early as Dec. 1, 2005.

Author Unknown, "Organic Polymers to Precede Nano Semi," EETimes.com, http://www.eet.com/story/OEG20030923S0055, at least as early as Dec. 1, 2005.

Author Unknown, "How, Why & Where to Use Self-Clinching Fasteners," PennEngineering, http://www.pemnet.com/fastening_products/about_self_clinching/index.html, 2 pages, at least as early as Dec. 21, 2011.

Author Unknown, "Physics News Update," American Institute of Physics, http://www.aip.org/pnu/1993/split/pnu148-3.htm, Oct. 19, 1993.

Author Unknown, "Polymer Light-Emitting Diodes," Philips Research—Technologies, http://www.research.philips.com/technologies/display/polyled/polyled/, at least as early as Dec. 1, 2005.

Author Unknown, "What is OLED (Organic Light Emitting Diode)?," WiseGeek.com, http://www.wisegeek.com/what-is-an-oled.htm?referrer+adwords_campaign=oled_ad=024 . . . , at least as early as Dec. 1, 2005.

Author Unknown, "What is PLED?—A Word Definition from the Webopedia Computer Dictionary," http://www.webopedia.com/TERM/P/PLED/html, at least as early as Dec. 1, 2005.

Braun et al., "Transient Repsonse of Passive Matrix Polymer LED Displays," http://www.ee.calpoly.edu/~dbraun/papers/ICSM2000BraunEricksonK177.html, at least as early as Dec. 1, 2005.

Rojas, "Optimus Keyboard Trumped by the Display Keyboard?," http://www.engadget.com/2005/07/29/optimus-keyboard-trumped-by-the-display-keyboard/, Jul. 29, 2005.

* cited by examiner

KEYBOARD WITH INCREASED CONTROL OF BACKLIT KEYS

CROSS-REFERENCE TO RELATED APPLICATIONS

The following related patent applications are hereby incorporated by reference in their entirety as if set forth fully herein: U.S. patent application Ser. No. 12/476,067, titled "Light Source With Light Sensor" and filed concurrently herewith; U.S. patent application Ser. No. 12/476,040, titled "User Interface Behaviors For Input Device with Individually Controlled Illuminated Input Elements" and filed concurrently herewith; and U.S. patent application Ser. No. 12/475,993, titled "White Point Adjustment For Multicolor Keyboard Backlight" and filed concurrently herewith.

BACKGROUND

1. Technical Field

The present invention relates generally to lighting control for keyboards, and more particularly to dynamic and individual control of backlighting for keys within a keyboard.

2. Background Discussion

Electronic devices are ubiquitous in society and can be found in everything from wristwatches to computers. While electronic devices such as computers operate in a world of ones and zeros, human beings do not. Thus, many computers include intermediary devices that allow human beings to interface to the computer. One such device is a keyboard which allows the user to interface with the computer by pressing certain keys. Optionally, the user may view a display connected to the computer to determine if the user's desired output was achieved, or input correctly entered.

While most conventional approaches implement keyboards and other intermediary devices as purely input devices, some conventional approaches may convey output information to the user of the computer via the keyboard. For example, when a user presses the CAPS lock key, a light at the top of the keyboard may light up to indicate that such a selection has been made. Alternatively, some conventional approaches may provide a keyboard that associates lights with its keys, where the keyboard may be statically configured at boot time. Unfortunately, these conventional approaches have several drawbacks. For example, most conventional keyboards lack the ability to convey complex information to a user (such as, for example, more information than just whether the CAPS lock key is on). Also, while some conventional keyboards may include backlit keys, conventional keyboards with backlighting do not offer the ability to dynamically control lighting schemes for each of the keys individually based upon interaction from the user (e.g., typing on a keyboard, mouse movements, or based upon which application is currently executing that is independent of a particular input from the user). Accordingly, methods and apparatuses that provide increased control of backlit keys for a keyboard are useful.

SUMMARY

Methods and apparatuses are disclosed that provide increased control of backlit keys for a keyboard. Some embodiments may include controllers within the keyboard that are capable of dynamically programming illumination of the keyboard based upon interaction from a user, where each key of the keyboard may be individually programmed in a dynamic manner. For example, a spell checking function may be executing on a computer system, and as the user types various words, the keyboard may dynamically program the illumination of keyboard controllers such that the next letter of the word being typed is illuminated by the keyboard. Also, different keyboard illumination schemes may be generated based upon mouse movements by the user and/or based upon which application is currently executing.

Data for controlling the keys of the keyboard may be generated as an array that may include such information as the identifier associated with a particular key (e.g., the "A" key), a brightness associated with this key (e.g., High, Medium, Low and so on), a color associated with this key (e.g., red, green, and/or blue), as well as a duration of illumination for this key (e.g., two seconds). The information in such a data array may be provided to the keyboard in this format or further processed to create different representations of the data based upon the sophistication of the keyboard circuitry. For example, in some embodiments, the keys of the keyboard may be light sources of any color, and may result from a combination of two or more primary colors, such as light sources capable of producing red, green, and/or blue (RGB) light. In such embodiments, the array may include individualized illumination information for each of the primary colors such as one second for the red light source at a first power level and two seconds for the green light source at a second power level. In other embodiments, the keys of the keyboard may be light sources that include a single color of illumination capable of producing differing shades of the same color.

Some embodiments of the keyboard may include at least two control circuits for controlling the illumination of the keys. For example, the keyboard may include a global controller that receives illumination information (such as data arrays of illumination information) and conveys this information to local controllers, where each local controller may independently control a group of keys. In these embodiments, one local controller may control the keys on the left hand side of the keyboard and another local controller may control the keys on the right hand side of the keyboard. Other embodiments may have different global/local controller configurations, such as a single combined global/local controller, any combination of global and local controllers, or a number of independent local controllers without a global controller.

Some embodiments may include a keyboard where the keyboard further includes a plurality of keys, a plurality of light sources coupled to the keys, and a global control circuit coupled to a first local control circuit controlling a first light source in the plurality and coupled to a second local control circuit controlling a second light source in the plurality. In these embodiments, the first and second local control circuits may be dynamically programmed during operation of the keyboard. Other embodiments may have different circuit configurations, such as a single combined global/local circuit, any combination of global and local circuits, or a number of independent local circuits without a global control circuit.

Other embodiments may include a system that includes a computer with a keyboard coupled to the computer. The keyboard may include a plurality of keys, a keyboard controller coupled to the plurality of keys, a plurality of light sources coupled to the plurality of keys, and a lighting control circuit coupled to the plurality of light sources. In these embodiments, the keyboard controller may detect a keystroke of a user associated with an application executing on the computer, and the lighting control circuit may be dynamically programmed based upon the keystroke.

Still other embodiments may include a method of operating a keyboard as an output device, where the method includes executing an application on a computer system (the computer system coupled to the keyboard), detecting a keystroke associated with the application, and dynamically controlling illumination of a plurality of light sources coupled to a plurality of keys of the keyboard, where the dynamic control may be based upon the keystroke, or alternatively, the dynamic control may be based upon other system events, such as mouse movement or a currently executing application.

BRIEF DESCRIPTION OF THE DRAWINGS

The use of the same reference numerals in different drawings indicates similar or identical items.

DETAILED DESCRIPTION OF THE INVENTION

Embodiments are disclosed that allow individual and dynamic control of backlit keys in a backlit keyboard. Some embodiments may include controllers within the keyboard that are capable of dynamically programming illumination of the keyboard based upon interaction from a user, where each key of the keyboard may be individually programmed in a dynamic manner.

Although one or more of these embodiments may be described in detail in the context of a computer system, the embodiments disclosed should not be interpreted or otherwise used as limiting the scope of the disclosure, including the claims. In addition, one skilled in the art will understand that the following description has broad application. Accordingly, the discussion of any embodiment is meant only to be exemplary and is not intended to suggest that the scope of the disclosure, including the claims, is limited to these embodiments.

Figure 1:
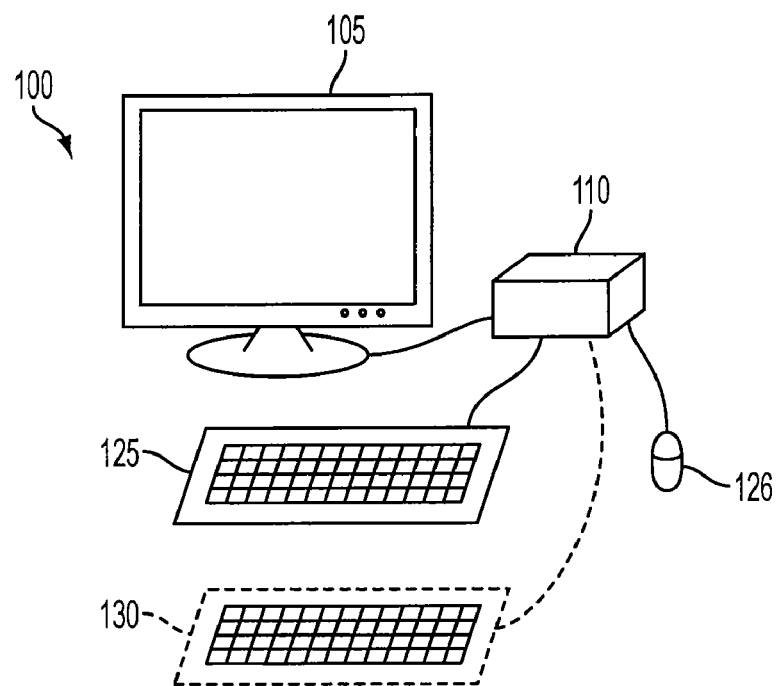
FIG. 1 illustrates a desktop computing system.

FIG. 1 illustrates a desktop computing system 100 capable of dynamic configuration of backlighting of a keyboard 125, where the system 100 may include a display 105 coupled to a computer 110. Note that although embodiments are disclosed herein where the computing system 100 is discussed in the context of a desktop or laptop computing system, the computing system 100 may take a variety of forms, such as a personal digital assistant, a cellular telephone, a portable gaming system, and so on. Furthermore, although the backlighting is discussed in the context of the keyboard 124, the backlighting concepts may be applied to a variety of peripheral devices, such as mice, gaming controllers, and so on.

The computer 110 may couple to one or more input devices such as a keyboard 125 and/or mouse 126. (The keyboard 125 is shown in greater detail below in FIG. 4). During operation, the computing system 100 generally executes application programs and/or operating system (OS) software under the direction of a user. The user may interact with the application programs or OS software via the keyboard 125. As will be described in further detail below, while the keyboard 125 and/or mouse 126 are conventionally used as input devices, the keyboard 125 and/or mouse 126 may be dynamically configured to provide output data to users, such as by illuminating the keys of the keyboard 125 in response to keystrokes from a user.

Depending upon the embodiment, the keyboard 125 and mouse 126 may take a variety of forms. For example in some embodiments, the keyboard 125 may be a 101-key US traditional keyboard configured to support the English language while the mouse may be a PS2 style. However, in alternative embodiments, the keyboard 125 may be a 102/105-key International keyboard configured to support non-English languages. In still other embodiments, the keyboard 125 may provide multimedia support, with dedicated keys for accessing and controlling multimedia files, or providing other specialized functionality.

While FIG. 1 depicts the keyboard 125 and mouse 126 coupled to the computer 110 via a hardwired connection, it should be appreciated that the keyboard 125 and mouse 126 may couple to the computer wirelessly, such as via an Infrared and/or Bluetooth connection. Also, optional input devices, such as a redundant keyboard 130, may be used to provide greater flexibility in operation of the computer 110. For example, the keyboard 125 and the keyboard 130 may be used by separate users, both of whom may be concurrently using the computing system 100.

Figure 2:
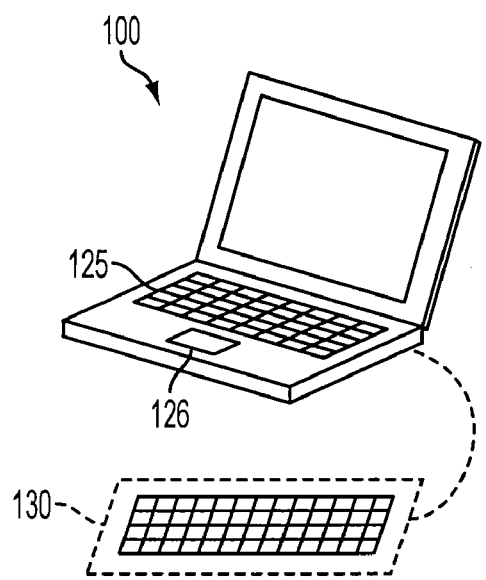
FIG. 2 illustrates a laptop computing system.

Some embodiments may implement the computer 110 as a Macintosh® computer manufactured by Apple Inc. For example, the computer 110 may be a Mac® Mini and the OS may be Mac OS® X. FIG. 2 illustrates an alternative embodiment where the computing system 100 is implemented as a laptop system, such as the MacBook® Pro, where the keyboard 125 and mouse 126 are integrated in the computing system 110. As will be described in greater detail below, in the embodiments where the computer 110 is implemented as a laptop, the keyboard illumination scheme may be dynamically controlled according to a specified power budget.

Alternative embodiments are possible where the computing system 100 is not a personal computer. For example, the computing system 100 may be a gaming system, such as the XBox® gaming system manufactured by Microsoft, Inc., the Playstation® gaming system manufactured by Sony, Inc., and/or the Wii® gaming system manufactured by Nintendo. As will be appreciated by one of skill in the art, the input devices, such as the keyboard 125 and mouse 126, may take a variety of forms depending upon the actual implementation of the computing system 100. For example, in the embodiments where the computing system 100 is a gaming system, the input devices may be game controllers with dynamic illumination operations akin to the keyboard 125 and mouse 126 (which are described in further detail below).

Figure 3:
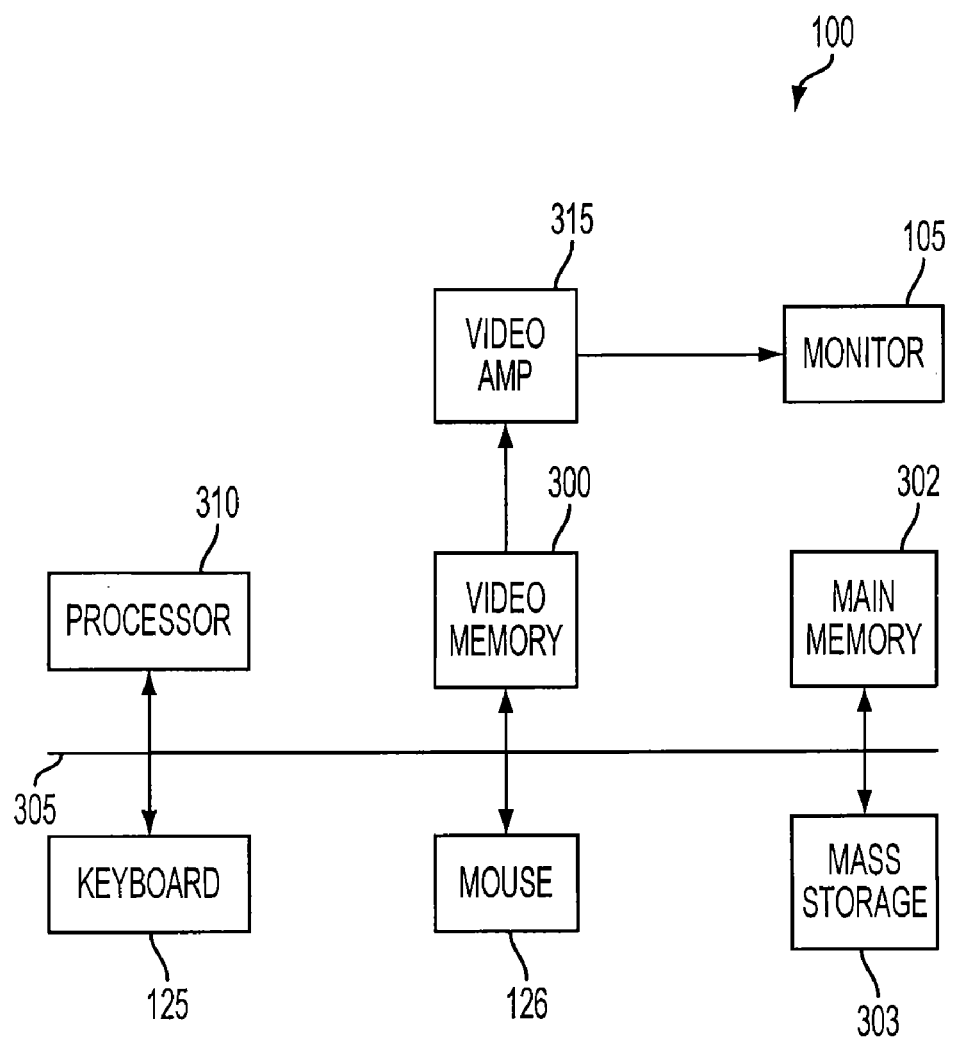
FIG. 3 illustrates a block diagram of the computing systems shown in FIG. 1 and FIG. 2.

FIG. 3 illustrates a sample block diagram of the computer system 100 described above in the context of FIGS. 1 and 2.

The system 100 may include a video memory 300, a main memory 302 and a mass storage 303, all coupled to a system bus 305 along with the keyboard 125, mouse 126 and processor 310. The mass storage 303 may include both fixed and/or removable media, such as magnetic, optical or magnetic optical storage systems and any other available mass storage technology. The bus 305 may provide, for example, address lines for addressing video memory 300 or main memory 302. The system bus 305 also may provide, for example, a data bus for transferring data between and among the components, such as processor 310, main memory 302, video memory 300, and mass storage 303. The video memory 300 may be a dual-ported video random access memory. One port of the video memory 300, in one example, is coupled to a video amplifier 315, which is used to drive the display 105. The display 105 may be any type of monitor suitable for displaying graphic images, such as a cathode ray tube monitor (CRT), flat panel, a liquid crystal display (LCD) monitor, a organic light emitting diode (OLED), or any other suitable data presentation device.

In some embodiments, processor 310 is a microprocessor manufactured by Motorola, such as the 680XX0 processor, or a microprocessor manufactured by Intel, such as the X86 line of processors. Any other suitable microprocessor or microcomputer may be utilized, however.

Depending upon the embodiment, the bus 305 may include multiple busses. For example, the bus 305 may include a Northbridge bus coupled between the processor 310 and the main memory 302 and video memory 300, as well as a Southbridge bus coupled between the processor 310 and the keyboard 125, mouse 126, and/or other peripheral devices.

During operation, code received by system 100 may be executed by the processor 310 as it is received, and/or stored in the mass storage 303, or other non-volatile storage for later execution. In this manner, system 100 may obtain application programs or OS software in a variety of forms. Application programs may be embodied in any form of computer program product such as a medium configured to store or transport computer readable code or data, or in which computer readable code or data may be embedded. Examples of computer program products include CD-ROM discs, ROM cards, floppy disks, magnetic tapes, computer hard drives, servers on a network, and solid state memory devices.

Figure 4:
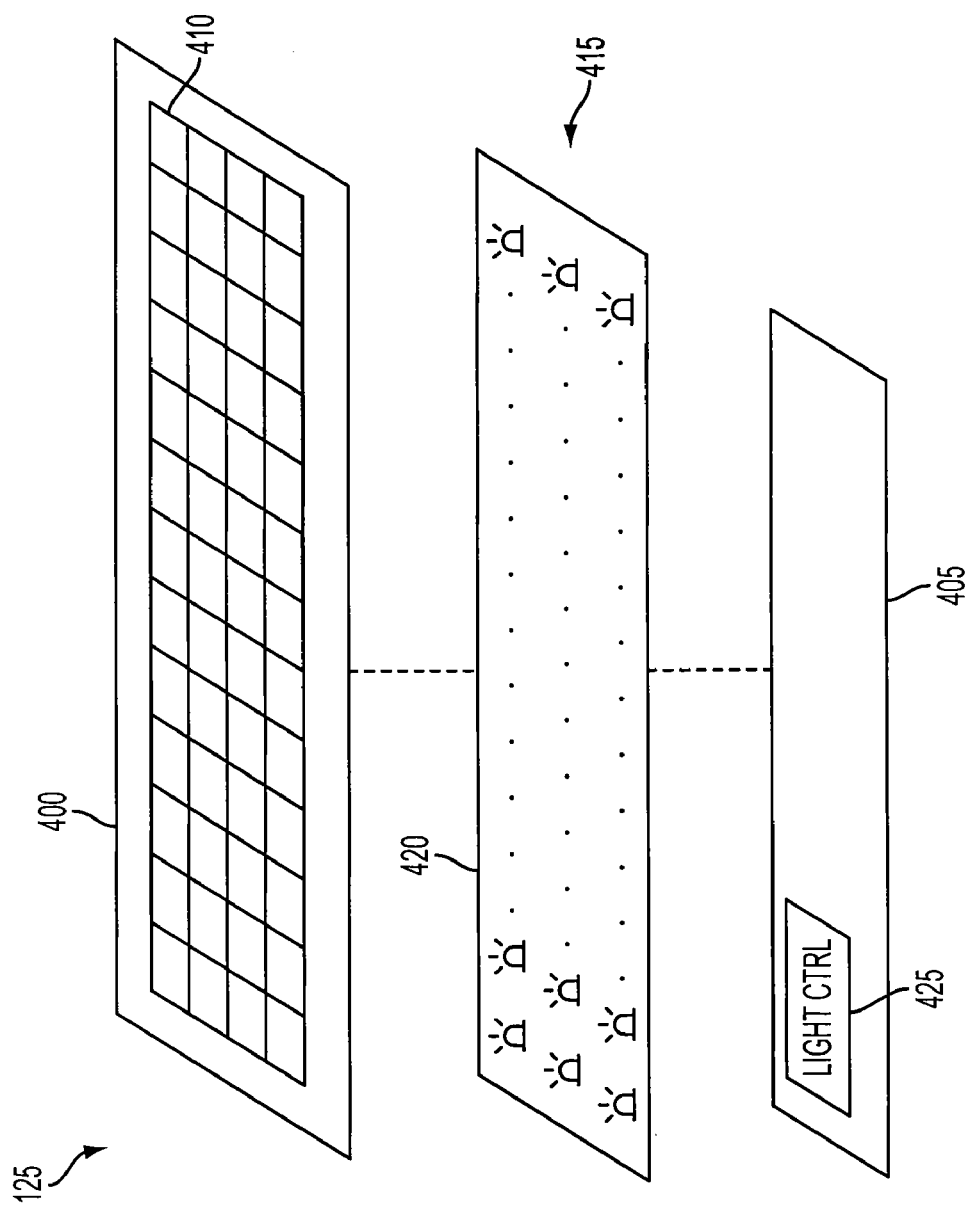
FIG. 4 illustrates a keyboard that may be used in the computing system.

FIG. 4 illustrates a n exploded view of the keyboard 125 shown in FIGS. 1 and 2. For ease of discussion, FIG. 4 shows only the keyboard 125. However, as was mentioned previously, alternative input devices may be illuminated in the manner described herein. Thus, the disclosure equally may apply to each of the numerous input devices in addition to the keyboard 125.

Referring to FIG. 4, the keyboard 125 may include a top portion 400 and a bottom portion 405 that come together in a sandwich-like fashion. The top portion 400 may include a plurality of keys 410 for data entry. As mentioned previously, the actual key configuration may be a 101-key US traditional keyboard configured to support the English language while other embodiments may include a 102/105-key International keyboard configured to support non-English languages. Although the top portion 400 is discussed herein in the context of mechanically actuated keys, alternative embodiments may include keys that are not mechanically actuated, such as capacitive, inductive, resistive or pressure sensing keys and/or keyboards. Also, while the keyboard 125 is shown as a rigid structure including top and bottom portions 400 and 405, alternate embodiments are possible where the keyboard 125 is a pliable material and the keyboard 125 may be folded into portions or may be rigid but still separated into portions and/or folded.

As shown in FIG. 4, the keyboard 125 also may include a plurality of lights 415 each placed adjacent to one or more of the keys 410. In some embodiments, the lights 415 may exist in an array of lights integrated within a structural grid 420 that is interposed between the top and bottom portions 400 and 405 as the keyboard 125 is manufactured. Each of the keys 410 may have a first portion that is transparent to light shining from underneath the keys 410 and a second portion that is opaque to light shining from underneath the keys 410. By lighting each of the keys 410 individually or in groups, the keyboard 125 may be advantageously used as an output device as well as the more conventional use as an input device. For example, in some embodiments, the keyboard 125 may be used to train new users on how to operate an application program and provide customized feedback based upon the users key entries. As will be described in further detail below, various embodiments may provide for dynamic configurability of the keys 410 on an individual or grouped basis. This may allow, for example, hotkeys associated with a particular application program to be dynamically lit whenever that particular application program is running on the computer 110. In addition, the output on the keyboard 125 may be based upon interaction from the user. For example, a spell check function may be implemented where different colored lights may indicate the next possible letter in the word being typed by the user (e.g., green for the next most probable letter in the word, red for the second most probable letter in the word, and blue for the third most probable letter in the word). In other embodiments, the output of the keyboard 125 may be based upon interaction with the user that is independent of any particular input from the user. For example, in some embodiments, the output to the keyboard 125 may occur in response to OS events or states or some other system event (e.g., a low power state).

In some embodiments, each of the lights 415 may be one or more light emitting diodes (LEDs) of differing colors. For example, in some embodiments, a single LED containing red, green, and blue (RGB) LEDs may be positioned underneath each of the keys 410. In other embodiments, the single LED may contain other light combinations such as cyan, yellow, and magenta (CYM), or amber-green to name but a few. Alternatively, three separate LEDs may be used to provide a mixture of primary colors. By mixing these three primary colors, a wide variety of resulting colors may be generated individually for each of the keys 410. In other embodiments, the lights 415 may be organic LEDs (OLEDs), and may generate a wide variety of display patterns and colors on each of the keys 410.

Figure 5B:
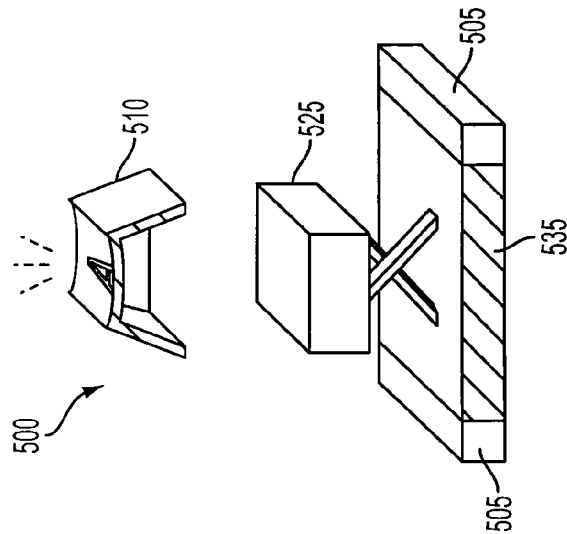
FIG. 5B illustrates another embodiment of a backlit key structure.
Figure 5C:
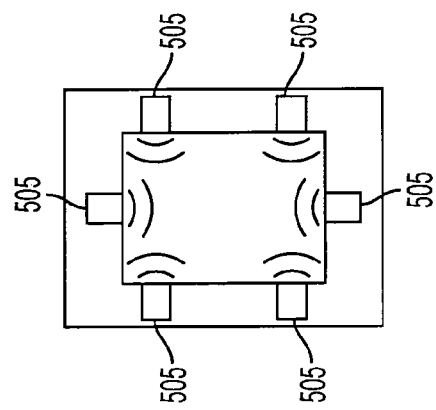
FIG. 5C illustrates a top view of one embodiment of a transparent layer that may be used in the backlit key structures shown in FIGS. 5A and 5B.
Figure 5A:
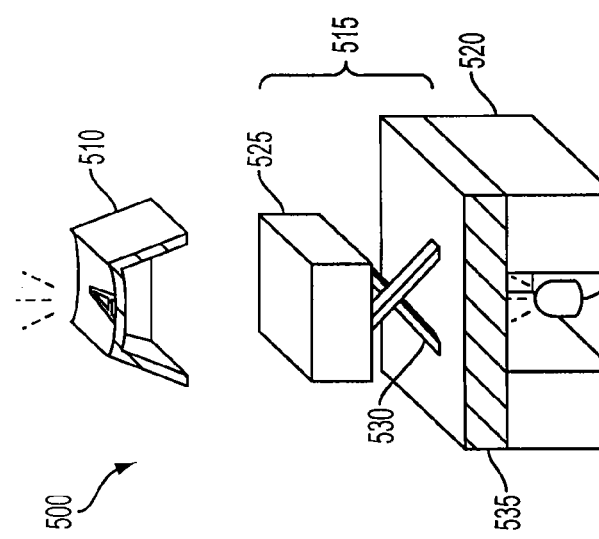
FIG. 5A illustrates one embodiment of a backlit key structure.

Other embodiments may place the lights 415 within the keys 410. For example, FIG. 5A illustrates a key 500 where a light source 505 is integrated within the key 500. The key 500 may be used in place of the keys 410 shown in FIG. 4, thereby eliminating the need for the mechanical grid 420 and still providing for individual lighting control of each of the keys 410. As shown in FIG. 5A, the key 500 may include a keycap 510 seated over a key depression assembly 515 and key light housing 520. The keycap 510 may include portions that are transparent to light from the source 505 and portions that are opaque to light from the source 505. For example, the keycap 510 shown in FIG. 5A illustrates the "A" key of a 101-key US traditional keyboard, where the "A" portion is transparent and the remainder of the keycap 510 is opaque. In this manner, as the source 505 emits light, the "A" portion may illuminate while the remaining portions of the keycap 510 are dark, which may provide the user of the keyboard 125 with the appearance of a glowing "A" key. Alternate embodiments are possible where other portions of the keys are illuminated. For example, the "A" portion may be dark while the remaining portions of the keycap 510 illuminate. Also, in some embodiments, rather than a single key having one or more light sources, a single light source may be associated with multiple keys. Thus, the light source 505 may be part of a light source that is shared among multiple keys.

The depression assembly 515 may detect key depressions, such as the user pressing the keycap 510. In some embodiments, such as those shown in FIG. 5A, the depression assembly may include a transparent top pad 525 that mates to the keycap 510. As the keycap 510 is depressed, the top pad 525 may compress one or more flexible springs 530 to signal that the key 500 has been pushed. An electrical circuit (not shown) may detect the compression of the springs 530 and thereby indicate that the key 500 has been pressed. The depression assembly 515 may be situated on top of a transparent layer 535 that allows light from the source 505 to emanate through the layer 535, through the top pad 525, and ultimately emanate out through the transparent pattern in the keycap 510 as described above. The transparent layer 535 may be one or more clear transparent layers of plastic material, such as Plexiglass®, tempered glass, plastic or the like. FIGS. 5B and 5C illustrate side and top views of alternate embodiments of the layer 535, that may consolidate space underneath the keycap 510. For example, in some embodiments, the layer 535 may be 0.6 millimeters thick, which may be several millimeters thinner than the thickness of conventional keys and thereby reduce the overall height of the key 500 shown in FIG. 5A. Also, depending upon the embodiment, the light source 505 may take a variety of forms, such as multiple LEDs, a single RGB LED, one or more side-emitting LEDs as shown in FIGS. 5B and 5C, and so on. The embodiments shown in FIGS. 5A-5C are merely illustrative, and alternate embodiments may include non-mechanically actuated keys, such as capacitive, inductive, pressure, and/or resistively actuated keys. Also, depending upon the embodiment, the transparent layer 535 may take on a variety of forms. For example, in the embodiments where the LEDs may be top firing, such as the embodiment shown in FIG. 5A, then the transparent layer 535 may be a diffuser or lens focusing mechanism that allows light to be shaped into a desired pattern, such as a Fresnel lens or elliptical lens. In other embodiments where the LEDs may be side firing, such as the embodiments shown in FIGS. 5B and 5C, the transparent layer 535 may be a light guide that receives light in the X-Y plane and redirects it in the Z plane.

Figure 6:
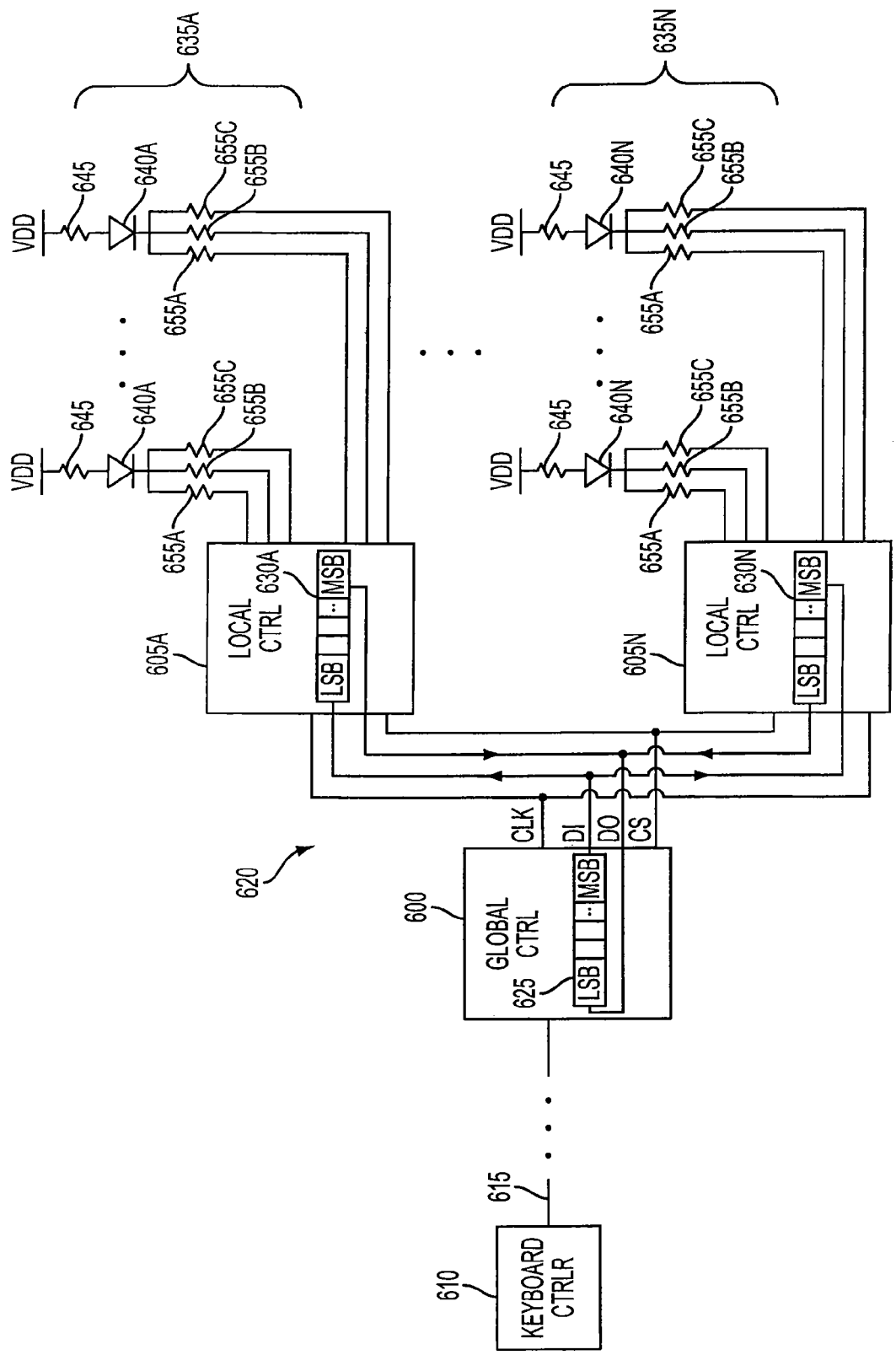
FIG. 6 illustrates one embodiment of a system that may provide individual and dynamic control backlit keys in a keyboard.
Figure 7:
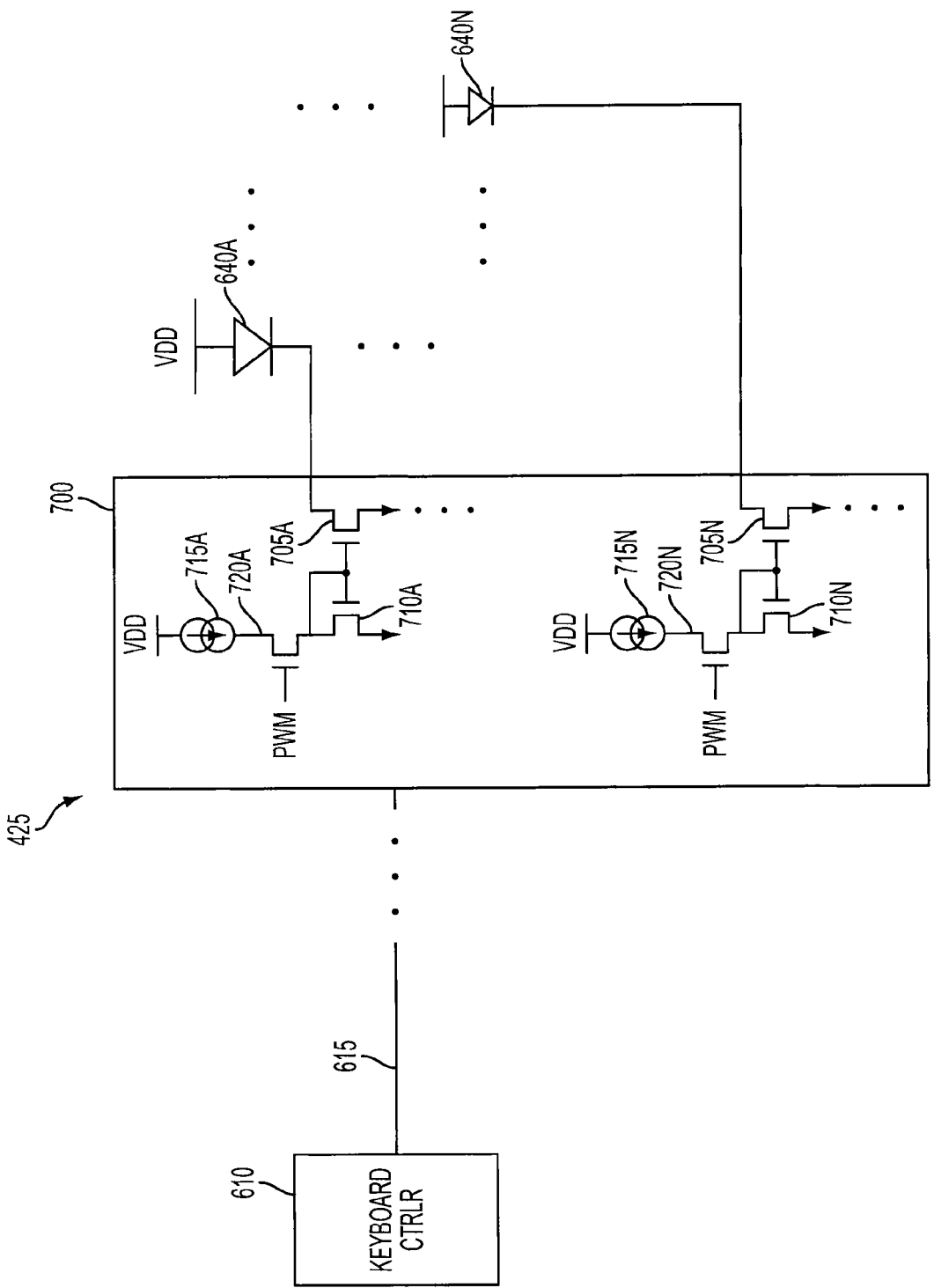
FIG. 7 illustrates another embodiment of a system that may provide individual and dynamic control of backlit keys in a keyboard.

Regardless of whether lights for the keyboard 125 are integrated within the keys as shown in FIGS. 5A-C or in a larger assembly as shown in FIG. 4, the keyboard 125 may include a lighting controller 425 as shown in FIG. 4. Although the lighting controller 425 is shown with respect to the keyboard 125, similar implementations may be used in other portions of the computing system 100, such as the computer 110 or the mouse 126. FIGS. 6 and 7 illustrate potential embodiments for the lighting controller 425 in greater detail.

Referring to FIG. 6, the controller 425 may include a global controller 600 coupled to one or more local controllers 605A-N. While FIG. 6 illustrates but one embodiment of the controller 425, it should be appreciated that other embodiments may have different global/local controller configurations, such as a single combined global/local controller, any combination of global and local controllers, or a number of independent local controllers without a global controller.

In some embodiments, the global controller 600 and/or the local controllers 605A-N may be microcontrollers, such as a model 8742 manufactured by Intel Corporation, or a PIC16F84 manufactured by Microchip, Inc. In other embodiments, the global controller 600 may be part of a larger integrated circuit, such as a microprocessor, capable of running in either master or slave mode. The global controller 600 may couple to a keyboard controller 610, which, as indicated by the dashed lines in FIG. 6, may be external to the keyboard 125. For example, it may be located within the computer 110 in some embodiments. During operation, the keyboard controller 610 may communicate desired lighting schemes to the global controller 600 thereby allowing the global controller 600 to dynamically control the keys 410 individually or in one or more groups. In the embodiments where power consumption is a concern, such as when the computer 110 is a laptop, the keyboard controller 610 also may communicate a desired power budget to the global controller 600 and allow the global controller 600 to dynamically control the keys 410 individually or in groups based upon the power budget constraints. For example, in these embodiments, the global controller 600 may establish a maximum number of keys that may be illuminated at any one time when the laptop is being powered off of the battery (e.g., five keys) and have no maximum number of keys that may be illuminated when the laptop is plugged into wall power.

The connection 615 between the keyboard controller 610 and the global controller 600 may take the form of any of a variety of multiple connection bussing protocols. For example, in some embodiments, the connection 615 may be a Universal Serial Bus (USB) protocol and/or a PS/2 protocol.

The global controller 600 may communicate with the local controllers 605A-N via a multiple connection electrical bus, such as a serial peripheral interface (SPI) bus 620, which is a synchronous serial data link capable of operating in full duplex mode. Other embodiments may implement the bus 620 as an inter-integrated circuit ($I^2C$) bus or a system management bus (SMBus). In the event that the bus 620 is implemented as a SPI bus, it may include four separate electrical connections: a serial clock (CLK) output provided by the global controller 600, a data in (DI) connection used by the global controller 600 for supplying data to the local controllers 605A-N, and a data out (DO) connection used by the local controllers 605A-N to communicate data to the global controller 600. As indicated by the dashed line in FIG. 6, an optional chip select (CS) connection signal from the global controller 600 to each of the local controllers 605A-N may be implemented, such as when the local controllers 605A-N are independently addressed.

Because the local controllers 605A-N may share the DO connection, the outputs of the local controllers 605A-N may be tri-state outputs. In this manner, when a particular local controller 605A-N is not selected, its outputs may be high impedance, thereby allowing multiple local controllers 605A-N to be electrically isolated from the local controller 605A-N that is currently in use and allow for individual control of the light sources coupled to the local controllers 605A-N.

During operation, the global controller 600 and the local controllers 605A-N may communicate in a master/slave fashion where the global controller 600 initiate communication between the global controller 600 and the local controllers 605A-N in the form of frames of data. To initiate a connection, the global controller 600 may configure the CLK signal to operate at a frequency that can be commonly supported by all of the local controllers 605A-N. In some embodiments, the local controllers 605A-N may be capable of operating in the range of 1-70 MHz. Thus, in the event that the local controllers 605A-N do not employ the same HW and/or have different operating frequencies, then the global controller 600 may select a frequency that is commonly supported by each of the local controllers 605A-N. For example, the local controller 605A may operate at 1 MHz while the local controller 605N may operate at 70 MHz. In such a situation the global controller 600 may adjust the CLK signal to operate at 1 MHz to accommodate both local controllers. In some embodiments, in addition to adjusting the CLK signal frequency, the global controller 600 may adjust the signal's polarity and/or phase to vary the behavior of signal transmission between the global controller 600 and the local controllers 605A-N.

In the example of FIG. 6, the bus 620 is implemented as an SPI bus. In this example, the global controller 600 may include a global register 625 and each of the local controllers 605A-N may include a local register 630A-N. The global register 625 may couple to each of the local registers 630A-N via the DI and DO signal lines, where data is sent to the local registers 630A-N via the DI signal line and data is received from the local registers via the DO signal line. Some embodiments may daisy chain input and output signals between the several local registers 630A-N such that the DI signal from the global controller 600 couples to the local controller 605A; the DO signal of the local controller 605B couples to the DI signal of the next local controller 605B, and so on until the DO of the local controller 605N couples back to the global controller 600.

In the embodiment shown in FIG. 6, the global register 625 and the local registers 630A-N may form an inter-chip circular buffer where bits of data in the global register 625 are shifted out of the global register 625 and received in the local register 630A-N in a bit-by-bit fashion beginning with the most significant bit (MSB) and ending with the least significant bit (LSB). Data signals that indicate individualized lighting schemes for the LEDs 640 (described in more detail below) may be communicated between the global controller 600 and the local controllers 605A-N by shifting this data from the global controller 600 one or more of the local controllers 605A-N. Once the global controller 600 has configured the CLK signal line, the global controller 600 may indicate, via the CS line, which of the local controllers 605A-N is being sent data.

During a cycle of the CLK signal, assuming the local controller 605A has been initiated with the CS signal, the global controller 600 may send a bit of data on the DI signal line and the local controller 605A may read the data from the DI line. Further, the local controller 605A may send a bit of data on the DO line, and the global controller 600 may read this data from the DO line. (Note that in some embodiments, one or more of these operations may be combined or eliminated.) Because the local controller 605A has been indicated with the CS line, the other local controllers 605B-n will disregard the CLK signal and signals on the DI and DO signal lines.

As shown in FIGS. 6 and 7, each of the local controllers 605A-N may be coupled to a group of light sources 635A-N. Although FIGS. 6 and 7 illustrate implementing the light sources as an array of LEDs 640A-N separated into groups 635A-N, any type of light source may be used in practice. Each of the groups 635A-N may be coupled to a separate local controller 605A-N, and therefore, each of the local controllers 605A-N may be capable of separately controlling the light sources 640A-N. For example, the local controller 605A may control the lights 640A in the group 635A while the local controller 605N may separately control the lights 640N in the group 635N.

Each LED 640 in the groups 635A-N may be separately coupled to a key of the keyboard 125. For example, the LED 640 may be implemented as the light source 505 as shown in FIGS. 5A-C. Furthermore, each of the LEDs 640 may be coupled to a network of resistors 645, 655A-C that regulate the current driven through the LEDs 640. In some embodiments, the combination of the resistors 645, and 655A may have a different resistive value than the combination of the resistors 645 and 655B and the combination of the resistors 645 and 655C. The local controllers 605A-N may therefore control the intensity of light emanating from the LEDs 640 by controlling which of the resistors 655A-C is active at any time. For example, the local controllers 605A-N may couple the resistors 655A-C to ground during activation. In some embodiments, one or more of the resistors 655A-C may be active at any one time to mix and match the resistive values, thereby producing different light intensities. Control of light intensity emitted by an LED may also be achieved or enhanced by selectively coupling one of the resistors 655A-C to ground while keeping other resistors in the group at high impedance.

In some embodiments, the lighting controller 425 (an example of which is shown in FIG. 4) may be implemented as a single integrated circuit rather than as the global and local controllers 600, 605A-N shown in FIG. 6. For example, FIG. 7 illustrates an embodiment where the controller 425 may be implemented as a single LED driver 700 thus eliminating or reducing the network of resistors 645, 655A-C. The driver 700 may include a plurality of switching devices, such as a first transistor 705A, coupled to an accompanying LED 640A. For the sake of discussion, the transistors shown in FIG. 7 are discussed as if they were n-type metal-oxide-semiconductor (NMOS) devices, however it should be appreciated that the transistors may be implemented with a variety of alternative electrical devices, such as p-type metal-oxide-semiconductor (PMOS) devices. The first transistor 705A may couple, via its gate connection, to a second transistor 710A that has its gate connection connected to its drain connection, which is sometimes referred to as a diode-connected transistor. Both the first and second transistors 705A and 710A may connect to ground through their source connections. Because the first and second transistors 705A and 710A have the same gate and source connections, they will share the same gate-source voltage, and as a result, will conduct a proportional amount of current. This arrangement is sometimes referred to as a "current-mirror". Depending upon the relatively sizing of the first and second transistors 705A and 710A, the amount of current flowing in the first transistor 705A may differ from the amount of current flowing in the second transistor 710A. For example if the first transistor 705A is half the size of the second transistor 710A, then the first transistor 705A may conduct half the amount of current flowing in the second transistor 720A (i.e., half of the current supplied by the current source 715A). Also, when the first and second transistors 705A and 710A are substantially the same size, they may conduct the same amount of current (i.e., a current substantially equal to the current flowing in the current source 715A). Thus, current flowing through the first transistor 705A may match the current flowing through the second transistor 710A, which may be set to a desired value by current source 715A that is connected to the drain of the second transistor 710A via a third transistor 720A.

The drain of the third transistor 720A may be connected to the current source 715A while the source of the third transistor 720A may be connected to the second transistor 710A. In this manner, the current source 715A may be connected between the drain connection of the third transistor 720A and a voltage supply, such as $V_{DD}$. During operation, the third transistor 720A may control the current supplied to the second transistor 710A by being turned on and off, for example by using a pulse width modulated (PWM) signal coupled to the gate connection of the third transistor 720A. The PWM signal may be generated within the driver 700, or alternatively, received from the keyboard controller 610 via the bus 615. As the third transistor 720A switches on and off per the PWM signal, the current flowing in the second transistor 710A may be mirrored to the first transistor 705A. For example, when the first and second transistors 705A and 710A are substantially the same size, and the third transistor 720A is on, then the current in the first transistor 705A may be substantially equal to the current supplied by the current source 715A. In some embodiments, the value of the current supplied by the current source 715A may be 20-25 milliamperes (mA). As a result of the second transistor 710A alternating between conducting current and not conducting current, the first transistor 705A may alternate between conducting and non-conducting states. The drain connection of the first transistor 705A may couple to the LED 640A so that the current flowing in the first transistor 705A may control the current in the LED 640A. By controlling the PWM signal, by virtue of the current mirror, the current flowing in the first transistor 705A and the LED 640A may be controlled, and therefore, the intensity of the light emanating from the LED 640A may be controlled.

As shown, the electrical devices within the driver 700 that are coupled to the LED 640A may be replicated and coupled to other LEDs in the array in a similar fashion. For example, the transistors 705N, 710N, and 720N and current source 715N may couple to the LED 640N in the same way that the transistors 705A, 710A, and 720A and current source 715A are coupled to the LED 640A. In this manner, the current flowing in each of the LEDs 640A-N may be uniform, thereby allowing the intensity of the light emanating from each of the LEDs 640A-N to be individually adjusted in a uniform manner. The ability to individually and uniformly adjust the light emanating from each of the LEDs 640A-N may be beneficial in many ways, such as by producing a more aesthetically pleasing output signal from the keyboard 125 to the user, or allowing output information to be conveyed to the user through the keyboard 125 more accurately.

Figure 8:
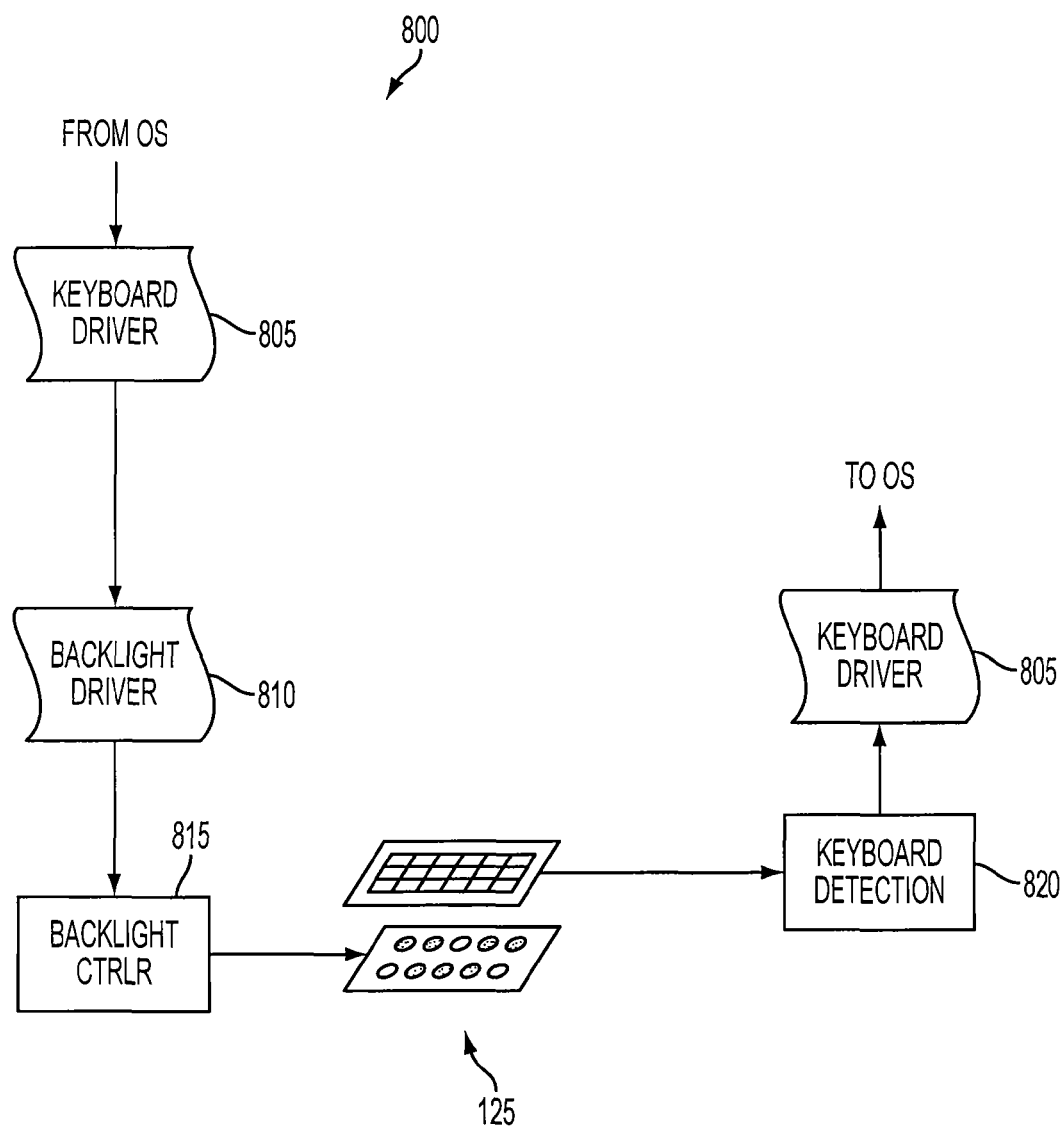
FIG. 8 illustrates a system configuration that may provide individual and dynamic control of backlit keys in a backlit keyboard.

FIG. 8 illustrates one of several potential configurations for various software and/or hardware elements 800 of the computer system 100 described above and FIG. 9 illustrates sample operations 900 of the software and/or hardware components 800 in one such embodiment. For ease of discussion, FIGS. 8 and 9 refer only to the keyboard 125. However, as was mentioned previously, numerous input devices are possible. While conventional keyboards are often used as input devices, it is possible to configure the computer system 100 such that the keyboard 125 may convey output data to the user. For example, if certain key combinations are entered while operating the keyboard, the computer system 100 may cause certain lights associated with keys of the keyboard 125 to dynamically control lights associated with the keys. As was mentioned previously, the dynamic control may be in response to user input (e.g., spell check functionality, teaching hotkey functionality, etc.).

Figure 9:
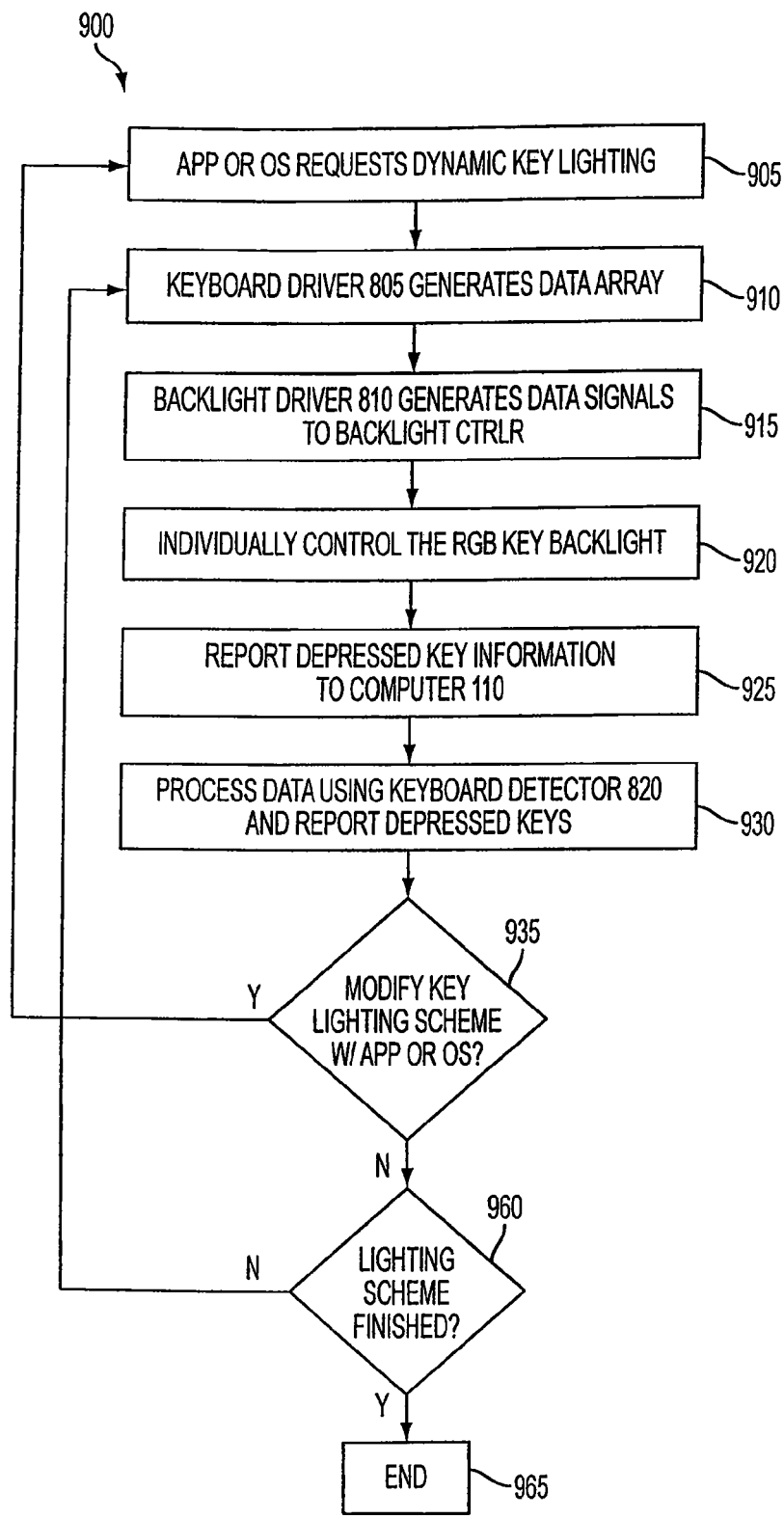
FIG. 9 illustrates operations that may be implemented to provide individual and dynamic control of backlit keys in a backlit keyboard.

Referring now to FIGS. 8 and 9, at least a portion of the OS running on the computer 110 may include a keyboard driver 805 that handles the individual color control of the keys 410 of the keyboard 125. The keyboard driver 805 may dynamically associate a key event from the keyboard 125 to a key lighting event. A "key lighting event" refers generally to the act of illuminating a key in response to a user input. In some embodiments, this input may be in the form of typical interaction with an application being executed on the computer 110. As one example of a key lighting event, if the user types all but the last letter of a word, a spell checker function may couple to the keyboard driver 805 to light the most probable last letter of the word being typed by the user. This is shown in FIG. 9 as operation 905 where the application or OS sends a request to the keyboard driver 805 to dynamically configure the keyboard 125 according to a particular lighting scheme.

As shown in FIG. 8, the keyboard driver 805 may couple to a backlight driver 810, which may be part of the OS in some embodiments. During operation, the keyboard driver 805 may send data to the backlight driver 810 in array form, such as an identifier associated with a particular key, a brightness associated with this key, a color associated with this key, as well as a duration of illumination for this key. Table 1 illustrates a potential array with this information for two keys of a sample keyboard.

TABLE 1

| Key | Brightness | Color | Duration |
|---|---|---|---|
| A | Medium | Red | 2 seconds |
| B | High | Blue | 1 second |

Although Table 1 illustrates potential signals for two keys, the array generated by the keyboard driver 810 may contain many entries. For example, in the event that the keyboard 125 is a 101-key US traditional keyboard, then the array may contain 101 entries each having a brightness, color, and/or duration. Furthermore, although Table 1 illustrates potential signals color illumination, non-color illumination signals (e.g., luminance only) are also possible. Generation of the array data for Table 1 may occur during operation 910 in FIG. 9.

The backlight driver 810 may couple to a backlight controller 815. In some embodiments, the backlight controller 815 may exist as a discrete integrated circuit within the keyboard 125. In other embodiments, the backlight controller 815 may exist as firmware stored in a read only memory (ROM) within another portion of the keyboard 125, such as the lighting controller 425. Regardless of the implementation of the backlight controller 815, during dynamic configuration of the keyboard 125, the backlight driver 810 may generate data signals for programming the backlight controller 425. This is shown in operation 915.

In some embodiments, the data signals generated by the backlight driver 810 may be in array form as shown in Table 2, which is akin to the array shown in Table 1, yet more rudimentary than the array of data shown in Table 1. The more rudimentary nature of the data signals in Table 2 may be beneficial, for example, in the embodiments where the driver 810 is less complex and unable to directly process the data of Table 1. Again, although Table 2 illustrates potential signals for but a few keys, the array generated by the driver 810 may contain many entries, such as when the keyboard 125 is a 101-key US traditional keyboard. In the embodiments where the registers 625 and 630A-N (shown in FIG. 6) are implemented, for example, when the bus 625 is an SPI bus, then the elements of the arrays shown in Tables 1 and 2 may be the values in each of the registers 625 and 630A-N.

As shown in Table 2, each individual key may have customized RGB values, current levels, and/or firing durations each red, green, and/or blue LEDs of each key of the keyboard 125. Notably, these customized values may vary as the keyboard 125 is dynamically controlled based upon user inputs.

TABLE 2

| Key ID | R, G, and/or B | Current Level | Duration |
|---|---|---|---|
| A | Red - 20% | Red - 5 mA | Red - 1 second |
|   | Green - 50% | Green - 12.5 mA | Green - 2 seconds |
|   | Blue - 10% | Blue - 2.5 mA | Blue - 3 seconds |
| B | Red - 70% | Red - 17.5 mA | Red - 7 seconds |
|   | Green - 50% | Green - 12.5 mA | Green - 0.5 seconds |
|   | Blue - 60% | Blue - 15 mA | Blue - 2 seconds |

In some embodiments, the values and/or settings shown in Table 2 may be implemented by the combination of the keyboard controller 610 in combination with the global controller 600 and local controllers 605A-N (shown in FIG. 6). In other embodiments, the values and/or settings shown in Table 2 may be implemented by the combination of keyboard controller 610 and the LED driver 700 (shown in FIG. 7). This is shown in operation 920, where the RGB backlights of the keyboard 125 may be individually controlled by dedicated hardware that is dynamically updated from the OS drivers.

Note that although Tables 1 and 2 illustrate potential signals for controlling key illumination, other embodiments are possible. For example, while Tables 1 and 2 include information regarding the duration of the illumination, other embodiments may control the LEDs with a pulse-width-modulated (PWM) for each of the individual colors. Each of the PWM signals may have a frequency of N, where the frequency of the PWM signal N may be chosen such that it is above the flicker detection threshold of the human eye (e.g., 60 Hz). In these embodiments, the computer 110 may determine values for the RGB backlights N times per second to determine an instantaneous desired color based upon the duty cycle of the PWM signal. For example, the RGB backlight may be off when each of the red, green, and blue backlights have a PWM signal with a duty cycle of 0%, and the RGB backlight may be a teal color when the red PWM signal duty cycle is 0%, the green PWM signal duty cycle is 100%, and the blue PWM signal duty cycle is 100%.

The keyboard controller 610 also may include firmware 820 capable of detecting keystrokes and conveying this information back to the computer 110 to allow dynamic control of the lighting schemes. In some embodiments, however, separate circuitry 820 may be included in the keyboard 125 to report keystroke information back to the computer 110. This reporting is shown in FIG. 9 as operation 925.

Regardless of whether reporting occurs via firmware or via dedicated circuitry, the keyboard driver 805 described above also may process data reported from the firmware or circuitry 820 and report depressed key sequences back to the OS or applications running on the computer 110. This is shown in operation 930. Reporting the depressed keys and/or key sequences back to the OS and/or applications running on the computer 110 may allow dynamic control of the keyboard 125 that is interactively based upon inputs by the user. Thus, per operation 935, in the event that the user's inputs require a modification of the current lighting scheme, control may flow to operation 905 where the OS or application may request dynamic key lighting re-configuration. On the other hand, if the user's inputs do not require a modification of the current lighting scheme, then control may flow to operation 960 where it may be determined whether the illuminating scheme is finished. In the event that the illumination scheme is not finished, control may flow to operation 910 where the keyboard driver 805 may continue to generate data arrays based upon the current lighting scheme. In the event that the illumination scheme is finished, then control may flow to operation 965, where the sample operations 900 may end.

Figure 10:
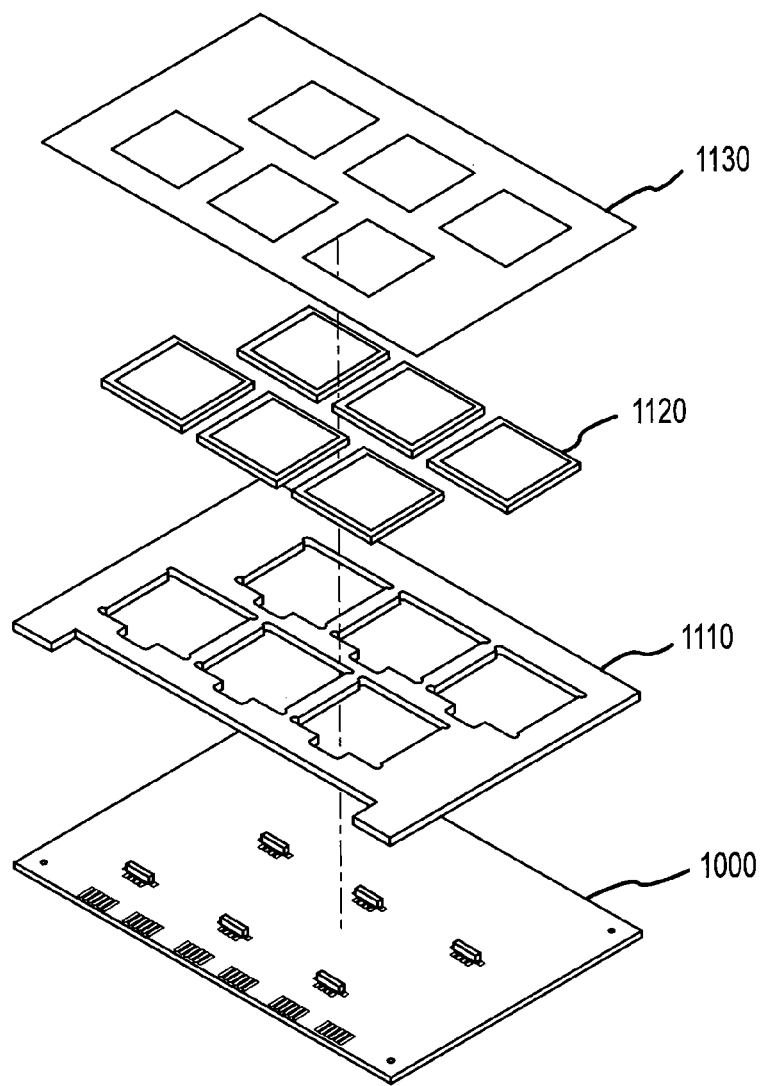
FIG. 10 illustrates an exploded view of one sample physical layout of various layers that may be used to construct part of a keyboard having independently-lighted keys.

FIG. 10 generally depicts one sample physical layout of various layers that may be used to construct part of a keyboard 125 having independently-lighted keys. That is, the elements shown in exploded view in FIG. 10 generally underlie the mechanical keys themselves. It should be understood that FIG. 10 displays only a segment underlying six keys of such a keyboard purely for the sake of simplicity. The entire layer of the keyboard may be constructed in the fashion and from the layers shown in FIG. 10.

Generally, a printed circuit board (PCB) forms a base layer 1000. Beneath each key, a multicolor LED (or multiple LEDs, each of which may emit a single color) are secured to the PCB 1000 and wired to a controller. A frame 1110 made of polycarbonate or another suitable material may overlay the base layer 1000. As shown in FIG. 10, the frame 1110 generally has a hole or opening defined above each LED package.

A separate lightguide 1120 is used for each key. In this fashion, each lightguide 1120 may distribute light from the underlying LED(s) to the corresponding key. The lightguides rest in the apertures formed in the frame 1110. When the frame, lightguide and PCB 1000 are affixed to one another, the LEDs rest in a notch defined in each opening in the frame with the lightguides adjacent the LEDs. In this manner, the LEDs may emit light into the side of the lightguides and the guides, in turn, may redirect the emitted light upward as well as diffuse it. For example, the lightguide may diffuse the light emitted by one or more associated LEDs across its entire upper surface and therefore across the entire upper surface of a key or may concentrate the emitted light in an area corresponding to an etched or transparent part of the key, as discussed with respect to FIG. 5. In one embodiment, the lightguide may be a microlens that diffuses and redirects light entering in a horizontal direction into a vertical direction. In the embodiment of FIG. 10, the LEDs are side-firing. The lightguide is typically made from an acrylic or like material.

A mask 1130 overlays the frame and PCB. The mask 1130 exposes at least portions of the upper surfaces of the lightguides 1120 but conceals the LEDs. The mask also holds the lightguides 1120 in place within the frame and atop the PCB 1000. As stated above, these layers, when assembled, are generally fitted within a keyboard and beneath the keys themselves.

While the present disclosure has been described with reference to various examples, it will be understood that these examples are illustrative and that the scope of the disclosure is not limited to them. Many variations, modifications, additions, and improvements are possible. More generally, examples in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A keyboard comprising:
a plurality of keys;
a plurality of light sources coupled to the keys; and
a global control circuit coupled to a first local control circuit controlling a first light source in the plurality of light sources and coupled to a second local control circuit controlling a second light source in the plurality of light sources, wherein the first and second local control circuits are dynamically programmed during operation of the keyboard based on detection of a keystroke associated with an application executing on a computing device coupled to the keyboard.

2. The keyboard of claim 1, wherein the interaction with the keyboard includes normal operation of an application program.

3. The keyboard of claim 1, wherein each of the plurality of keys includes a light source from within the plurality of light sources configured to emit two or more colors.

4. The keyboard of claim 1, wherein the first and second light sources are independently controlled.

5. The keyboard of claim 1 further comprising a first register within the first local control circuit and a second register within the second local control circuit, wherein data is serially shifted from the first register to the second register while the first and second local circuits are dynamically programmed.

6. A system comprising:
 a computer;
 a keyboard coupled to the computer, the keyboard comprising:
  a plurality of keys;
  a keyboard controller coupled to the plurality of keys;
  a plurality of light sources coupled to the plurality of keys; and
  a lighting control circuit coupled to the plurality of light sources;
 wherein the keyboard controller detects a keystroke associated with an application executing on the computer, and the lighting control circuit is dynamically programmed based upon the keystroke.

7. The system of claim 6 further comprising a display, wherein the lighting control circuit is further programmed based upon information on the display.

8. The system of claim 6, further comprising an additional keyboard wherein the additional keyboard mirrors the keystroke.

9. The system of claim 6, wherein each of the keys in the plurality of keys includes an assembly with a transparent piece.

10. The system of claim 9, wherein at least two of the plurality of light sources are side-emitting LEDs coupled to the transparent piece.

11. The system of claim 6 further comprising a first driver executing on the computer, wherein the driver detects the keystroke and reports this information to a second driver executing on the computer.

12. The system of claim 10, wherein each of the plurality of light sources is independently controlled.

13. The system of claim 12, wherein the keyboard is non-rigid.

14. A method of operating a keyboard as an output device, the method comprising the acts of:
 executing an application on a computer system, the computer system coupled to the keyboard;
 detecting a keystroke associated with the application; and
 dynamically controlling illumination of a plurality of light sources coupled to a plurality of keys of the keyboard, wherein the dynamic control is based upon the keystroke.

15. The method of claim 14 further comprising the act of generating a data array comprising individual illumination data for each key in the plurality of keys.

16. The method of claim 15, wherein the individual illumination data is dynamically changeable based upon the keystroke.

17. The method of claim 15, wherein each of the light sources are capable of simultaneously emanating at least two primary colors and the data array includes separate illumination information for each of the two primary colors.

18. The method of claim 15 further comprising directly driving a lighting control circuit within the keyboard using information in the data array.

19. The method of claim 14, wherein the dynamic control of the keyboard illuminates a light source from the plurality of light sources that is associated with a key of a probable subsequent key.

* * * * *